Jan. 9, 1945.  V. L. WESTBERG ET AL  2,366,889
MOTOR TESTER
Filed Feb. 6, 1942   8 Sheets-Sheet 1

Inventors
Vivian L. Westberg
Arthur U. Nelson Jr.
Vernon C. Westberg
By Thiess, Olson & Mecklenburger Attys.

Jan. 9, 1945. V. L. WESTBERG ET AL 2,366,889

MOTOR TESTER

Filed Feb. 6, 1942   8 Sheets-Sheet 5

Jan. 9, 1945.   V. L. WESTBERG ET AL   2,366,889
MOTOR TESTER
Filed Feb. 6, 1942   8 Sheets-Sheet 8

Inventors
Vivian L. Westberg.
Arthur N. Nilson &
Vernon C. Westberg.
By: Thiess, Olson & Mecklenburger. Attys.

Patented Jan. 9, 1945

2,366,889

UNITED STATES PATENT OFFICE 2,366,889

MOTOR TESTER

Vivian L. Westberg, Arthur N. Nilson, and Vernon C. Westberg, Chicago, Ill., assignors to John R. Tapp and Otto L. Rhoades, a copartnership doing business as Sun Manufacturing Co.

Application February 6, 1942, Serial No. 429,822

8 Claims. (Cl. 177—311)

This invention relates to analyzing devices for internal combustion engines and more particularly to a compact portable tester for automobile and airplane engines or the like, wherein a number of interrelated testing instruments are combined in a common structure and employ a common electrical arrangement. The present invention is also capable of continuous operation over an extended period of time for "running in" or "breaking in" distributors of various types under predetermined conditions of operation.

Various testing instruments have heretofore been proposed to electrically indicate specific engine characteristics such as distributor cam dwell, motor speed, distributor synchronization, etc. However, such instruments must be independently connected to and operated solely by the ignition system of the engine under test and therefore the operation of the engine may be impaired so as to make the test results vary substantially from the true normal operation of the engine. Such independent units must be separately, and not concurrently, connected to the engine under test.

It is therefore an object to provide a device for testing either an operating engine or a separate distributor, in which the testing instruments are controlled by, but energized independently of, the ignition circuit of the engine or of the separate distributor under test.

It is also an object to provide a combustion engine analyzer wherein a single electrical circuit connection to the engine or to a separate distributor to be tested may be employed to operate a plurality of indicating devices, which devices may be operated independently or concurrently for true analytical comparison of the readings of each test.

A further object is to provide an analyzer by which accurate engine operation tests may be made of an engine while the engine is in actual operation and without affecting or impairing the normal operation thereof.

The present invention includes variable drive means whereby a portion of an engine's electrical system, such as its distributor, may bodily be removed from the engine and may independently be operated by such drive at selected speeds while tests are being conducted thereon. Associated with the variable drive mechanism is a stroboscopic apparatus to enable accurate analysis of each phase of the distributor's operation and synchronization of the operation of the respective parts.

The novel stroboscope and mechanism associated therewith is also adapted to enable easy reading of the angle of spark advance, and the detection of defective distributor cams, breaker points, vacuum advance, or vacuum brake, and instantly indicates any inaccurate setting, timing, or operation of such related devices.

All required ignition characteristics of an engine operating at various speeds may be determined by merely completing a single circuit connection from the analyzer through the distributor, or the operating characteristics of the distributor alone may be determined by mounting the distributor on the synchronizer for operation thereby at various speeds and completing the single circuit connection through the distributor in the same manner as in testing a distributor assembled on and operated by an engine. The circuit connection in either case is preferably accomplished by means of only two extension conductors each provided with a terminal clip so that one conductor may removably be connected to the primary terminal of the distributor and the other conductor grounded either on the engine or on the synchronizer, as the test may require.

Further objects will be apparent from the specification and the appended claims.

Referring to the drawings in detail, the embodiment illustrated comprises a portable cabinet or the like A, on which is supported three inclined panels 1, 2, and 3. An electrically operated tachometer 4, a cam dwell meter 5, and a control section 6 are mounted on the left-hand side panel 1. The right-hand side panel 2 supports a vacuum gauge 7, a vacuum pump and motor assembly 8, and a control section 9.

A stroboscopic synchronizer is mounted on the central panel 3 and is provided with a holding and operating unit for a distributor to be tested. A distributor D is shown mounted in testing position in Fig. 1 and is also shown in dotted lines in Fig. 2. The driving mechanism for the synchronizer includes a motor and a variable speed transmission by which the distributor may be operated at selected speeds.

Figure 2:
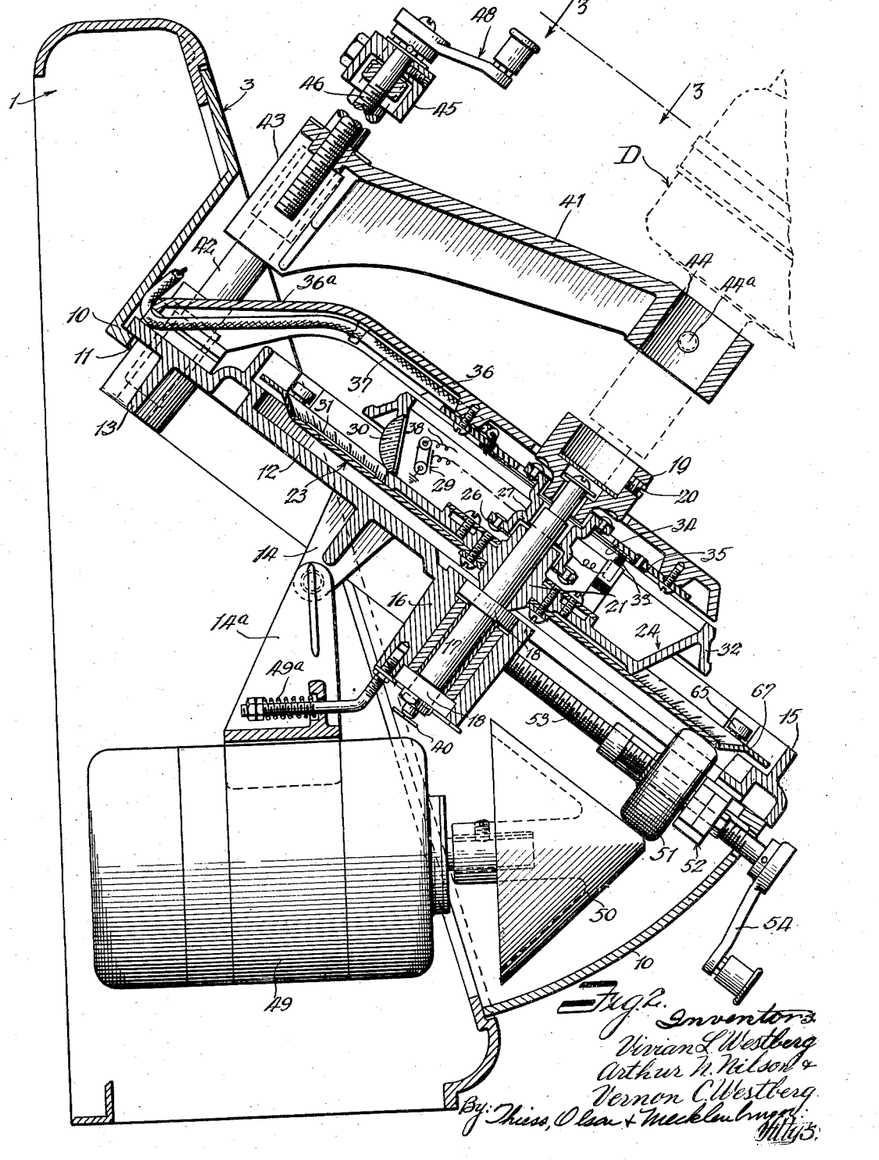
Fig. 2 is a detail vertical sectional view taken on the vertical central transverse plane of the embodiment shown in Fig. 1.

The structure and operating mechanism of the synchronizer are more clearly shown in Fig. 2, wherein the panel 3 is provided with an angularly displaced central portion 10 preferably inclined approximately forty-five degrees from the vertical and having a large round central opening 11.

The synchronizer unit is mounted in the opening 11 and comprises a base plate 12 secured to the portion 10 of the panel. The back of the base 12 is provided with reinforcing ribs 13 and depending motor supporting brackets 14. The base plate 12 also has an upstanding circular flange 15, which flange is concentric with an integral depending bearing hub or boss 16 for supporting a driven hollow stub shaft 17. The lower end of the stub shaft is rotatably supported by suitable ball bearings 18 and is provided adjacent its free end with a socket 19 to receive various interchangeable split collets or the like, each collet being adapted to receive therein the end of a corresponding type of distributor shaft. A setscrew 20 is provided to clamp the collet to a distributor shaft and simultaneously lock the collet in the socket so that the distributor may be positively driven from the shaft 17.

The shaft 17 has a hub 21, which hub may be a press fit on the shaft to secure it for rotation therewith. Securely bolted to this hub for rotation therewith is a flat circular disc or stroboscope plate 23. Also forming an integral part of the hub above the disc 23 is a dished stroboscope tube housing 24, the entire assembly being adapted for rotation as a unit with the shaft 17. The back surface of the disc 23 also functions as a friction surface whereby the disc and distributor may be driven at any required speed by means of a variable speed friction drive transmission which will be described later.

Figure 5:
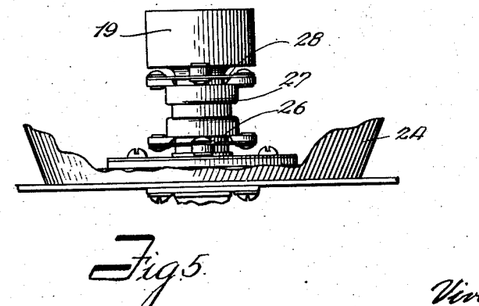
Fig. 5 is a side elevation of the flexible coupling for driving a distributor.

Secured to the upper end of the hub 21 is a coaxial flexible coupling (Figs. 2 and 5) comprising a flexible ring 26 secured to the hub at diametrically opposite points and secured to a coupling sleeve 27 at diametrically opposed intermediate points. The upper end of this sleeve 27 is secured to an intermediate portion of a similar flexible ring 28, which latter ring is likewise secured to the collet-holding socket 19 in the usual manner of flexible couplings whereby the socket is rotated thereby in a manner to accommodate slight inaccuracies in the alignment of the parts.

The dished stroboscope tube housing 24 is provided with a neon or the like flash tube 29 mounted therein in any suitable manner as shown in Fig. 2 so that its flash rays will pass through an adjacent lens 30 mounted in the wall of the housing and will be directed upon an arrow or other suitable indicia 31 (Figs. 2 and 3) upon the disc 23, the arrow being in fixed alignment with the lens.

The arrow 31 is preferably an embossed portion of the disc 23 as shown and is suitably surfaced to reflect incident light rays. As the disc 23 and housing 24 rotate together as a unit, the lens 30 is always opposite the arrow and, upon an instantaneous flash of the stroboscope tube, the moving arrow appears to the eye of an observer to stand still at the precise point wrere the flash occurs.

The tube housing 24 is also provided with an outwardly and downwardly extending peripheral shade flange 32 so that stray light from the lens will not strike the eye of the observer.

The stroboscope tube housing 24 is also provided with an upstanding contact brush 33, which latter may be a carbon brush or other suitable contactor forming a part of an electrical circuit for controlling the tube. The brush is in constant wiping contact with a contact ring 34, which latter is secured to an insulating plate 35, the plate, in turn, being secured to an overhanging fixed cover member 36. The cover member 36 is provided with an axial opening through which the distributor collet socket 19 projects and which opening is sufficiently large to permit the necessary flection of the universal coupling and socket when the device is in operation.

Figure 4:
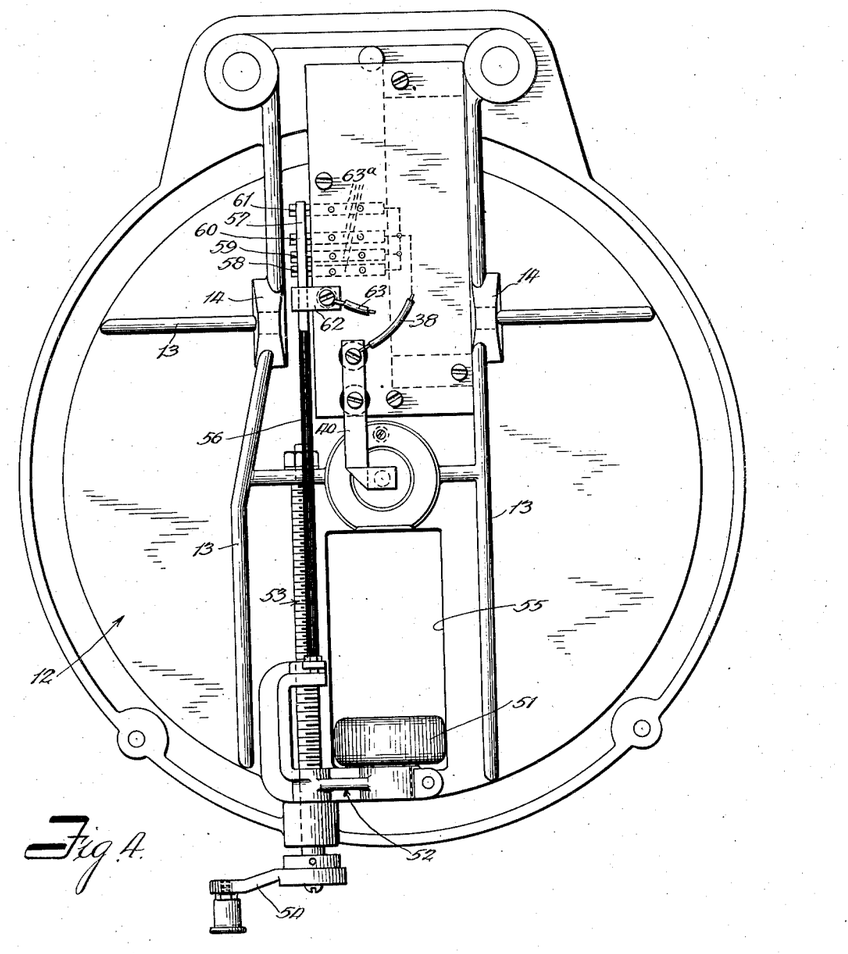
Fig. 4 is a back view of the synchronizer unit shown in Figs. 2 and 3.
Figure 6:
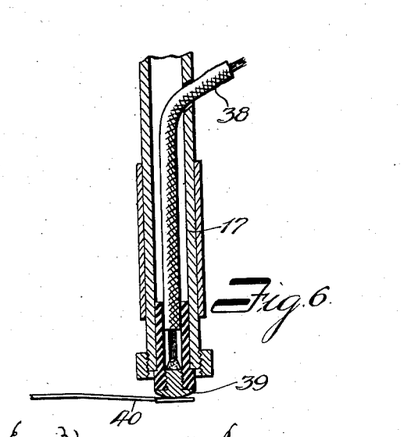
Fig. 6 is an axial sectional view through the hollow stub shaft of the synchronizer.

The neon or other gas type flash tube 29 previously mentioned is provided with an external trigger grid and the trigger terminal is electrically connected in series with the brush 33, contact ring 34, and a conductor 37 connected to the contact ring 34 and extending underneath the supporting arm 36a of the fixed cover member 36. A conductor 38 is connected to a terminal of the neon tube, the other terminal of the tube being grounded. The conductor 38 passes through the hollow stub shaft 17 and is provided with a contact terminal 39 extending from the bottom of the shaft and insulated therefrom, as shown in Fig. 6. A resilient brush 40 (Figs. 2 and 4) is fixed on insulated supports secured to the base plate 12 and in constant electrical contact with the rotatable terminal 39. The brush 40 forms a continuation of the conductor 38 and is electrically connected to a loading condenser for the neon tube as will later be described in connection with the electrical circuit shown in Fig. 8. The electrical connections just described form part of an electrical testing circuit for flashing the neon tube and this circuit will be described in detail later.

A vertically adjustable distributor supporting arm 41 (Figs. 2 and 3) is slidably supported on guide rods 42 by means of bearing portions 43. The vertical adjustment permits the mounting of various types of distributors on the synchronizer. The free end of this supporting arm is provided with a distributor supporting opening 44 in axial alignment with the socket 19 so that the shank of a distributor housing D may be inserted therein and secured by means of a thumb screw 44a as shown by dotted lines in Fig. 2. The guide rods 42 are supported in and extend outwardly from the base 12 and are parallel to the axis of the stub shaft 17 so that, at all positions of vertical adjustment, the shaft of the distributor being tested is maintained substantially in axial alignment with the stub shaft 17.

Figure 3:
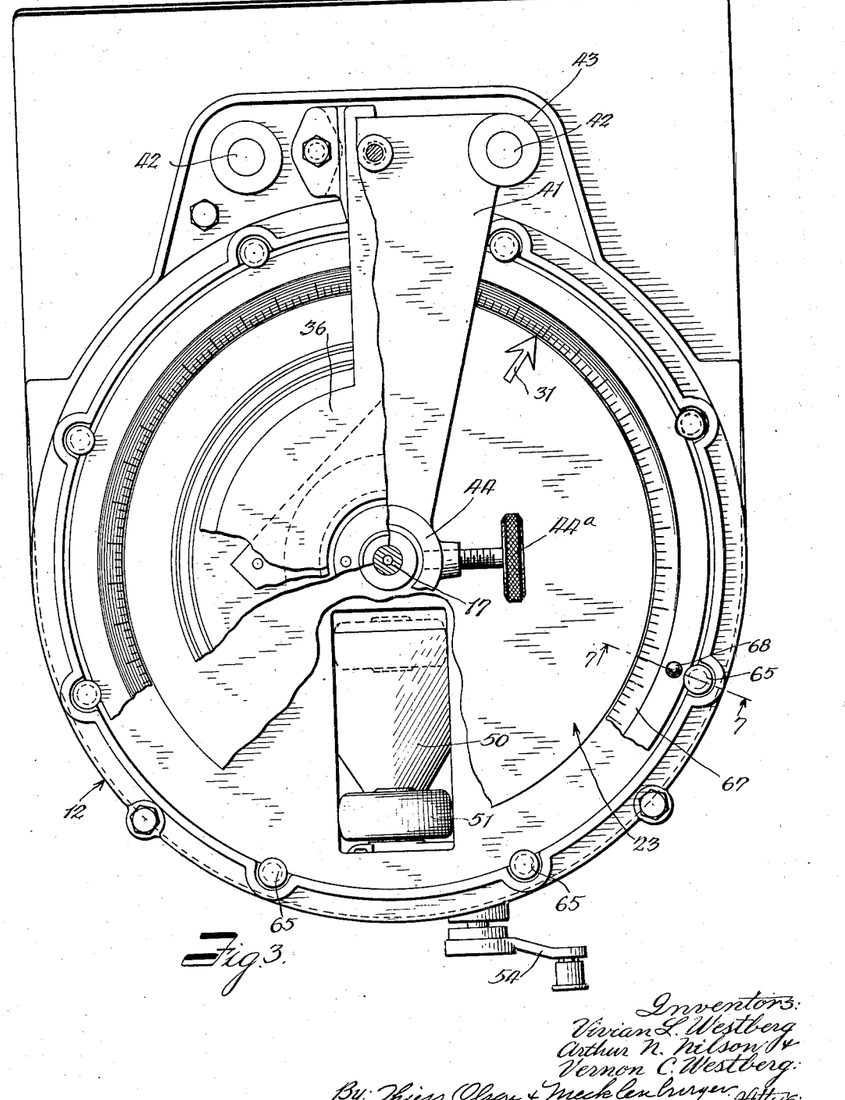
Fig. 3 is a plan view of the synchronizer unit taken in the direction of the arrow in Fig. 2, a portion being broken away for purposes of illustration.

The guide rods 42 are joined at their upper ends by a cross bar 45. An adjusting screw 46 is rotatably mounted on the cross bar 45 and threaded through an opening 47 in the arm 41 so that the arm may be raised and lowered on the guide rods by manually operating a crank handle 48 secured to the outer end of the adjusting screw.

The variable speed drive mechanism by which the stub shaft 17 and associated parts, including the driveshaft of a distributor under test, are rotated, comprises a reversible constant speed motor 49 (Fig. 2) having a friction cone 50 secured to the motor shaft. The motor 49 is pivotally suspended on the depending bracket arms 14 of the base 12 by means of a motor bracket 14a on the motor so that the motor shaft and the stub shaft 17 are in the same vertical axial plane but angularly disposed relative to each other as shown. The friction cone 50 is positioned so that its driving surface is substantially parallel to the under surface of the stroboscope disc 23, which latter also functions as a friction disc. An idler friction roller 51 is mounted between the friction cone 50 and the stroboscope disc 23 and is preferably formed of rubber or the like to secure a suitable friction transmission between the cone and disc.

Figures 11, 12, 13:
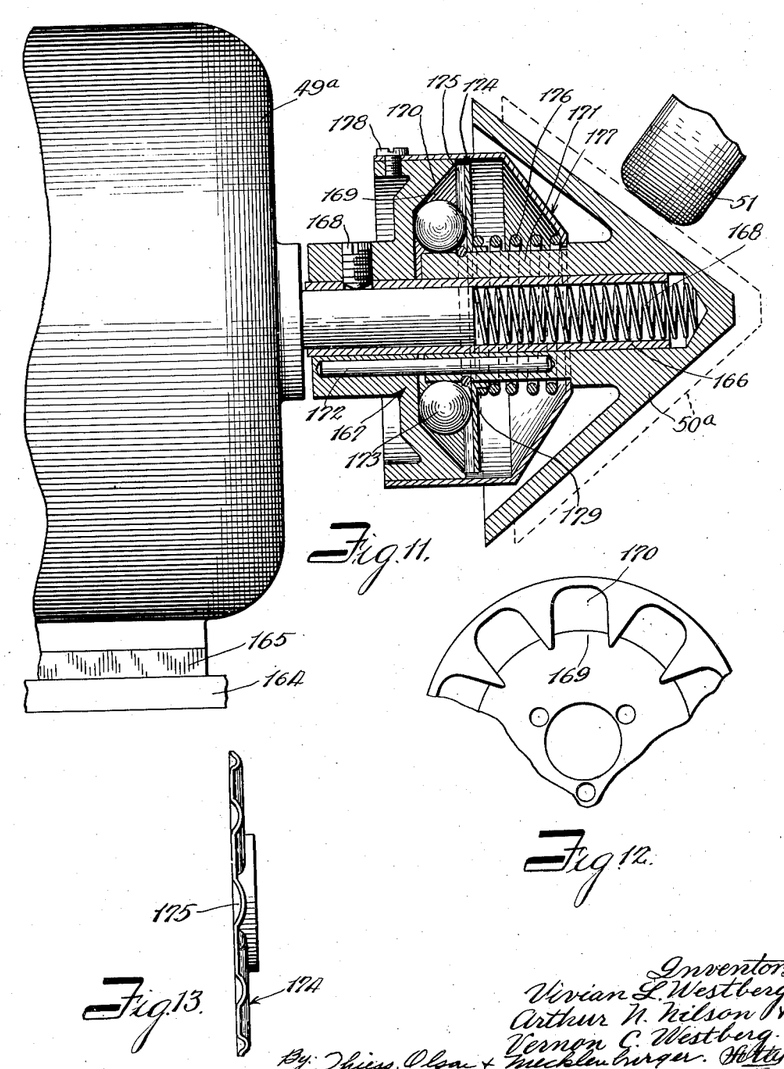
Fig. 11 is an axial sectional view through a preferred form of friction drive mechanism for the stroboscopic disc.
Fig. 12 is a fragmentary face view of the ball supporting rotor shown in Fig. 11.
Fig. 13 is a side elevation of the ball retaining disc shown in Fig. 11.

The friction idler 51 is axially adjustable between the friction cone and the friction surface of the stroboscope disc to vary the speed of the disc as required. To manually accomplish this adjustment, the roller 51 is rotatably supported on a bracket 52, which bracket is supported in threaded relation on an adjusting screw 53. The adjusting screw 53 is rotatably supported in suitable bearings on the base 12 and the outwardly extending free end is provided with a crank handle 54. The base plate 12 has a radially extending opening 55 through which the roller 51 extends and frictionally contacts the disc 23, along which disc it may radially be moved by rotation of the threaded shaft 53 to provide the desired speed control. In the embodiment shown in Fig. 2, the driving elements of the transmission are retained in the required frictional relationship by means of a compression spring 49a between the pivoted motor and the base 12. The compression of the spring is adjustable by means of suitable lock nuts as shown. A preferred construction for this purpose is shown in Fig. 11, and will be described later.

The bracket 52 supporting the friction idler 51 is provided with an elongated rod 56 of insulating material extending therefrom and adjustable therewith and having a tip extension 57 of current conducting material, which tip, upon axial movement of said rod, progressively engages condenser contacts 58, 59, 60, and 61 (Fig. 4) of a suitable loading condenser in the tube circuit to thereby vary the capacity in the stroboscope tube circuit in accordance with variations in speed in a manner hereinafter described in detail. The extension tip 57 is slidably supported in a bearing 62, which bearing is insulated from the base 12 and forms a terminal for a conductor 63 also forming part of the stroboscope circuit. By this means the capacity of a portion of the circuit may progressively be decreased relative to increased speed and vice versa.

Figure 7:
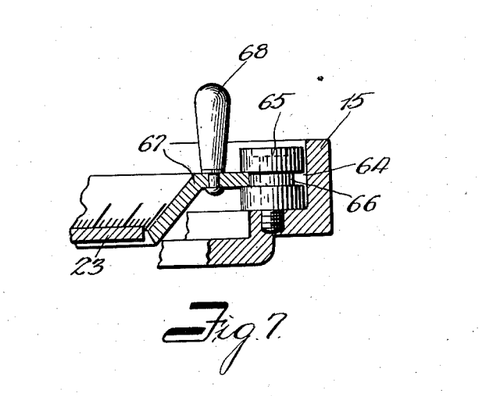
Fig. 7 is a detail sectional view through one of the protractor ring supports and is taken on line 7—7 of Fig. 3.

The upstanding circumferential flange 15 on the synchronizer unit base 12 is provided with spaced recesses 64 (Fig. 7) to accommodate disc supporting rollers 65, each roller having an annular groove 66 intermediate its ends. A protractor ring 67 (Figs. 1, 2, and 7) is suspended in these grooves so as to be freely rotatable concentrically with the stroboscope disc and the ring has a handle 68 for ease of operation whereby the protractor may readily be set to any desired point.

Figure 1:
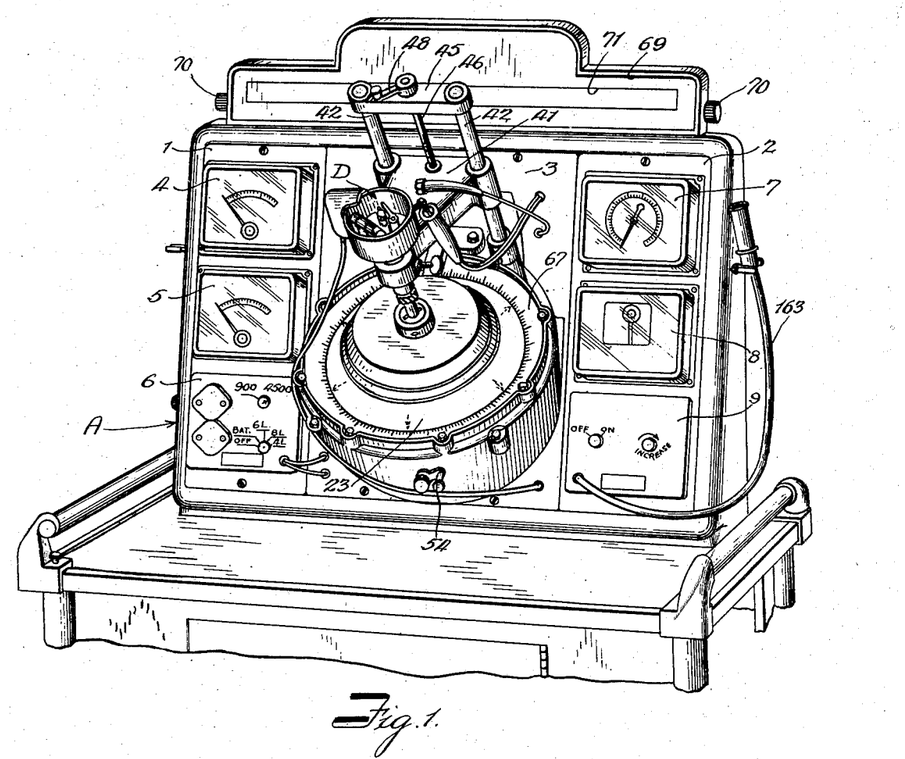
Fig. 1 is a perspective view of an assembled engine analyzer unit illustrating one embodiment of the invention.

At the top of the cabinet A is a casing 69 containing a pair of rollers on which is wound a chart containing all necessary data with respect to the standardized characteristics of various engines and distributors such as dwell period, vacuum advance, automatic advance, and the like as applied to various automobiles. The rollers are provided with knobs 70 so that the chart may be moved to expose any required data through a window 71.

In operation, after a distributor has properly been inserted and secured in the supports, and the motor started, the arrow 31 rotates adjacent the inner edge of the protractor ring 67 and, upon the precise points in the rotation of the distributor under test wherein the circuit breaker points separate, there is a succession of arrow flashes adjacent the protractor ring, and the position of these flashes, as shown by the illuminated arrow, clearly indicates the separation in degrees between successive circuit breaker interruptions. The protractor ring is graduated in degrees and is adjustable relative to the position of the arrow flashes so that the zero indicia on the protractor may be set in alignment with one of the flash arrows and the distance between successive flashes of the stroboscope light may readily be read in degrees. Also any movement of the light arrows in response to spark advance or the like may easily be observed and read in angular degrees.

The number of lobes on the distributor cam determines the number of stroboscopic flashes which will occur upon each revolution of the driveshaft. Thus, the six-lobe cam of the usual distributor of a six-cylinder engine causes the breaker points thereof to separate six times for each revolution of the distributor shaft, providing six spaced flashes which appear as fixed arrows separated by angles of sixty degrees rotation of the distributor shaft. In a distributor for a four-cylinder engine, four flash arrows would be separated at an angle of ninety degrees, while for an eight-cylinder engine eight flashes are separated by an interval of forty-five degrees. The stroboscope flash tube employed may be of standard character installed substantially as diagrammatically shown in Fig. 2 so as to bodily rotate with the stub shaft 17.

Figure 8:
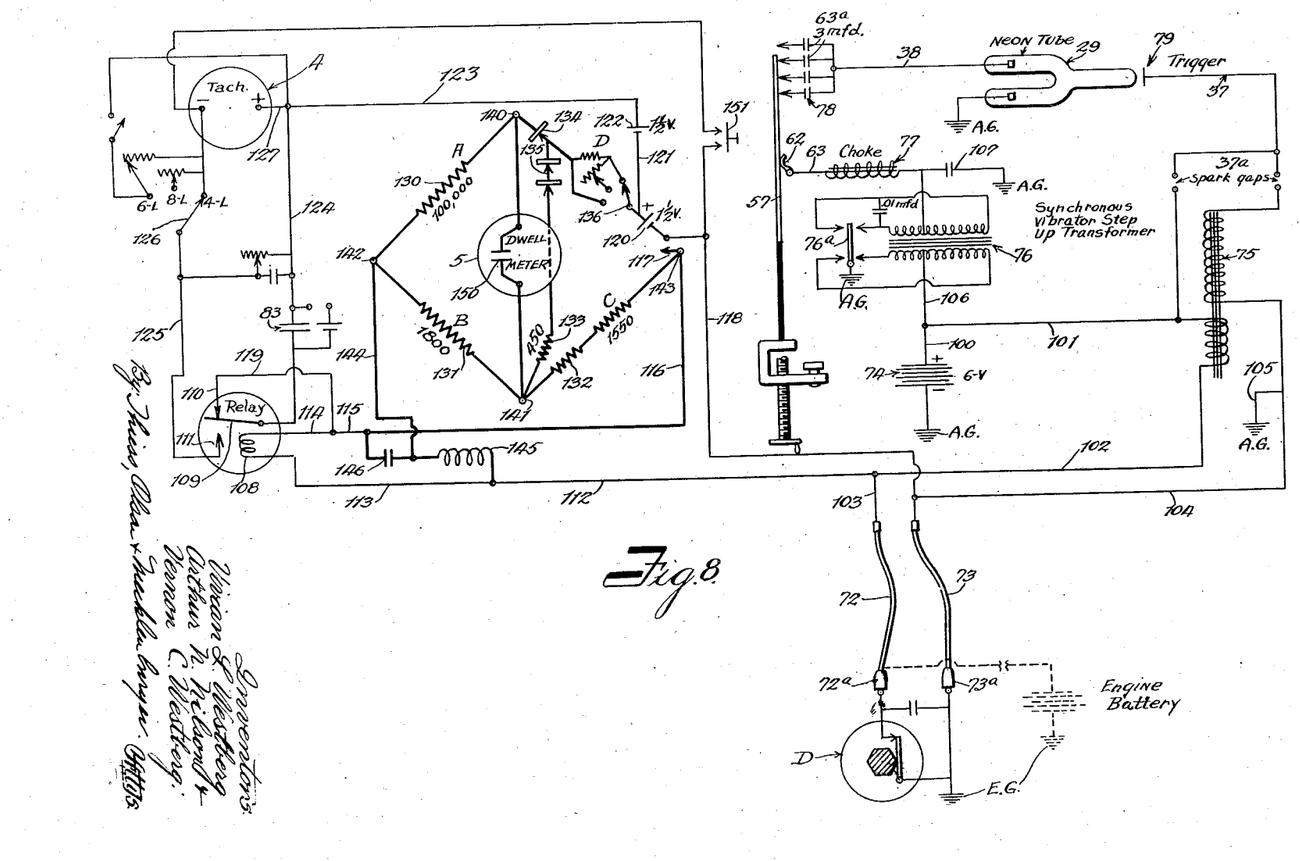
Fig. 8 is a schematic electrical circuit diagram showing the interrelated circuits for the stroboscope, tachometer, and dwell meter.
Figure 10:
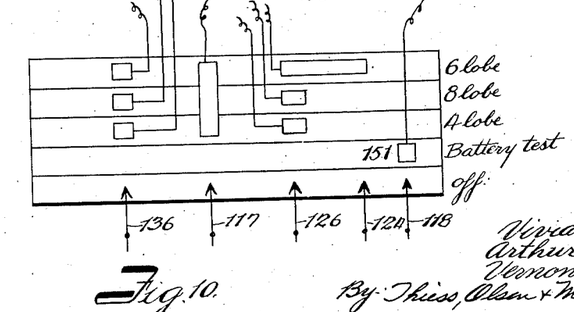
Fig. 10 is a diagrammatic development of a multipole five-position switch for controlling the testing circuits.

The complete electric circuits for the stroboscopic device, the dwell meter, and the tachometer are illustrated somewhat diagrammatically in Fig. 8 and, by virtue of the circuit connections there shown, it is possible either separately or simultaneously to make all of the various tests without interference between the individual parts of the interrelated circuits. This feature of the circuit connections illustrated in Fig. 8 constitutes an important part of the invention and is not believed to have heretofore been accomplished in the art. While preferably a single multiple-pole multiple-position switch, such, for instance, as diagrammatically illustrated in Fig. 10, is utilized to vary certain of the circuit connections in order to provide for the testing of four, eight, or six-lobe distributors, as desired, certain of the component parts of this switch are indicated in the diagram (Fig. 8) as separately operable switches in order to simplify the showing of the circuit connections. It will, of course, be understood that a plurality of separately operable switches may be used in place of a single multiple-pole multiple-position switch, if desired.

Referring first to the right-hand portion of the circuit connections shown in Fig. 8, which portion constitutes the control for the neon tube or stroboscope, it will be observed that the internal circuits of the analyzer are arranged for connection through suitable extension conductors 72 and 73, having terminal clips 72a and 73a, to the distributor D and the ground side of the engine EG, respectively.

The necessary energization for the stroboscopic circuits is provided by a six-volt battery 74 connected to energize the respective primary windings of a spark coil 75 and of a power pack 76.

The energization circuit for the spark coil 75 extends from the positive side of the battery through the conductors 100 and 101, the primary winding of the spark coil, the conductors 102 and 103, the extension conductor 72, the distributor D, the extension conductor 73, the conductors 104 and 105, and by way of the analyzer ground connections AG to the opposite side of the battery.

The power pack 76 is of a type readily available upon the market and includes a step-up transformer, the primary and secondary windings of which are connected as shown to a double-pole double-throw vibrator element 76a. The midpoint of the primary winding of the power pack transformer is connected, as shown, to the battery 74 through a conductor 106, and the vibrator element is connected to ground, as shown, to provide a suitable return circuit.

In the previously described circuit for the spark coil 75, it has been assumed that the distributor has been removed from the engine and mounted on the synchronizer for operation thereby, but if desired the distributor may be left on the engine and the speed of the stroboscope disc synchronized with the engine speed. In this latter case the engine battery which normally supplies the ignition system of the engine will be in parallel with the battery 74 of the analyzer and the voltage supplied to the analyzer circuits will therefore be unaffected.

The secondary side of the power pack 76 is connected as shown, through a choke coil 77 and a variable condenser 78, to one terminal of the gas tube 29, and the opposite terminal of the tube is connected to the analyzer ground so as to provide a proper return circuit. Also connected to the secondary side of the power pack is a suitable condenser 107 which latter serves as a reservoir or tank for the tube circuit. When the tube 29 is tripped or ignited as hereinafter described, the condenser 78 immediately discharges therethrough, but the choke 77 serves to block the condenser 107 from the tube circuit until after the flashing of the tube has terminated. Thus the discharge of the condenser 107 through the tube 29 is prevented, and the condenser 107 serves to recharge the condenser 78 preparatory to another flashing operation.

The power pack 76 is arranged to supply approximately 500 volts across the terminals of the tube 29 and, inasmuch as a voltage of this magnitude is insufficient to cause breakdown of the tube resistance, an external trigger terminal 79 is provided and is connected as shown through a conductor 37 and suitable spark gaps 37a to the spark coil 75. The purpose of the spark gaps 37a is to block out the oscillating voltage surges which follow the initial high voltage surge utilized to cause a break-down flash of the tube 29.

It will now be apparent that opening of the breaker points of the distributor D so as to interrupt the primary circuit of the spark coil 75 produces a high voltage surge in the secondary which surge is effective to cause breakdown of the tube 29 and flash a brilliant light at the exact instant of break at the ignition points. Consequently the flash is in exactly timed relation with the point action and the high voltage surge on the trigger terminal 79 permits substantially instantaneous discharge of the loading condenser 78 through the tube 29 to accomplish the desired lighting of the tube.

The loading condenser 78 is so adjusted as to have a capacity of approximately two microfarads when in a position corresponding to slow speed operation of the distributor and a discharge on the order of fifty amperes in less than one-millionth of a second occurs through the neon tube 29. The distributor speed may be varied over a wide range, preferably from 100 R. P. M. to 2200 R. P. M., and, as the speed is increased, the increased rapidity of the discharge through the tube 29 requires that the capacity of the loading condenser be relatively decreased to maintain proper voltage regulation of the power pack and prevent burn-out of the tube. Accordingly, the variable speed mechanism, as previously described, is arranged to vary the capacity of the loading condenser 78 in accordance with variations of the speed of operation of the stroboscope device.

As previously indicated, the stroboscope circuit, the dwell meter circuit, and the tachometer circuit in the motor analyzer of this invention are so combined in a single electric circuit that only one pair of connecting leads need be attached to the distributor undergoing test, in order to provide for any and all of the various tests. The circuit connections are such that the various instruments and test apparatus will respond only to the specific characteristics for which they are intended and will be unaffected by the electrical characteristics of the other circuits.

The tachometer testing circuit, as shown in the lefthand portion of Fig. 8, comprises a milliammeter 4, preferably graduated to read directly in R. P. M. and adapted to be controlled by a tachometer relay having a winding 108 and a movable contact arm 109 arranged alternately to engage the contacts 110 and 111 as the winding is de-energized and energized, respectively. The winding 108 is connected as shown across the terminals of the distributor D through a circuit which extends from the lead conductor 72 through the conductors 103, 112, and 113, the winding 108, the conductors 114, 115, and 116, the contacts of the multiple-position switch 117, and by way of a conductor 118 to the lead conductor 73. Thus, as the distributor contacts open and close during operation thereof, the winding 108 will be alternately energized and de-energized to operate the movable contact 109 between the contacts 110 and 111.

When the movable contact 109 is in engagement with the contact 110 of the tachometer relay, a circuit is completed which extends from the contact 110 through the conductors 119, 115, and 116, the contacts of the switch 117, the battery 120, which latter is preferably a one and one-half volt battery, a conductor 121, a second one and one-half volt battery 122, and the conductors 123 and 124, to one side of a suitable condenser 83, the other side of which is connected as shown to the movable relay contact 109. The condenser 83 is so related to the circuit in which it is connected that it will receive a maximum charge each time the contact 110 is closed, even though the contact remains closed for only an instant. Upon opening of the contact 110 and closure of the contact 111, a circuit is completed through which the condenser 83 may discharge, which circuit extends from the contact 111 through the conductor 125, the contacts of the multiple-position switch 126, the tachometer milliammeter 4, and by way of the conductors 127 and 124 to the condenser 83, the other side of which is connected, as previously stated, to the movable contact 109.

Thus, operation of the relay serves alternately to charge the condenser from the batteries 120 and 122 and to discharge the condenser through the tachometer milliammeter 4. Since the amount of charge accumulating on the condenser 83 does not depend upon the duration of the engagement of the contacts 109 and 110, the average current supplied to the tachometer is independent of the duration of contact and is directly proportional to the speed of operation of the tachometer relay. It will accordingly be seen that the tachometer will give a direct reading of the speed at which the distributor is operating.

The dwell meter 5 is connected, as shown, in circuit with a plurality of resistors 130, 131, 132, and 133; a pair of rectifier elements 134 and 135, which are preferably of the copper disc type; a pair of multiple-position switches 117 and 136; and a one and one-half volt battery 120. This circuit provides a Wheatstone bridge having the arms A, B, C, and D, respectively, thereof connected at the nodes or corners 140, 141, 142, and 143, respectively.

The dwell circuit thus produced is adapted to be energized from the same conductor leads 72 and 73 as connect the tachometer circuit to the distributor, and the energization circuit, which will be hereinafter described, is connected by means of the conductors 116 and 144, respectively, to the nodes 142 and 143, the dwell meter 5 being connected as shown across the bridge nodes 140 and 141. In order to supply a substantially flat-topped voltage wave to the dwell bridge circuit, a suitable inductance 145 and a condenser 146 are connected in series circuit with each other across the distributor leads and in parallel circuit relation with the relay winding 108, and the conductors 116 and 144 previously referred to are connected to opposite sides of the condenser 146 as shown.

When the distributor points are closed, a short circuit is of course impressed across the lead conductors 72 and 73 and accordingly no voltage is applied to the dwell circuit from these leads. Under these conditions, a current is caused to flow through the dwell meter by the battery 120, which current is sufficient in magnitude to cause the indicating needle of the dwell meter to occupy a position corresponding to its maximum reading. This circuit may be traced from the positive side of the battery 120 through the multiple-position switch 136 and the rectifier 134 in the arm D of the bridge, from the node point 140 through the dwell meter 5 to the node point 141, and by way of the resistor 132 in the arm C of the bridge and the multiple-position switch 117 to the negative side of the battery. Small additional currents will, of course, flow through the resistors 130 and 131 and by way of the conductor 144, the inductance 145, the conductor 113, the relay winding 108, and the conductors 114, 115, and 116 to the node point 143 and through the switch 117 to the negative side of the battery, but these small currents have no effect on the operation of the dwell meter. Likewise, there is a tendency for current to flow through the feed-back circuit including the rectifier 135 and the balancing resistor 133, but the high resistance of the rectifier 135 to current flow in this direction will prevent any appreciable current from passing through this feed-back circuit.

As soon as the distributor points open during operation of the distributor D, a voltage will be applied to the parallel circuit comprising the relay winding 108, the inductance 145, and the condenser 146 and a voltage equal to that built up across the condenser will be applied to the nodes 142 and 143 of the Wheatstone bridge circuit. This voltage may vary in magnitude from approximately 4½ volts, which corresponds to the ignition voltage during cranking of the engine, to the maximum ignition voltage of 6 or 12 volts depending upon the voltage of the engine battery or test battery being used. In order to provide proper operation of the dwell meter over this range of voltage, the resistors 130, 131, and 132 in the arms A, B, and C of the bridge circuit are so correlated with the back resistance of the rectifier 134 and the internal resistance of the battery 120 in the arm D of the bridge that substantially zero voltage will be produced across the bridge nodes 140 and 141. Consequently, zero current will flow through the dwell meter during the time that the distributor points are open and the needle of the dwell meter will tend to return to its zero position. The proportionate periods of time during which the dwell meter is thus subjected to maximum energization and to zero energization depend upon the dwell of the distributor cam and accordingly the meter will give an indication of these dwell periods.

In order to prevent fluctuation of the indicating needle on the dwell meter, a suitable condenser 150, which may be on the order of a 2,000 microfarad condenser, is connected directly across the terminals of the dwell meter so as to cause the indicating needle to assume a steady position corresponding to the average current flow and to the proportionate periods of time during which the dwell meter is energized and de-energized. Preferably the dwell meter is graduated to read directly in degrees so as to facilitate ready determination of the dwell period.

The feed-back circuit comprising the resistor 133 and the rectifier 135 serves to provide substantially zero voltage conditions across the node points 140 and 141 over the complete voltage range, this feed-back circuit being connected in parallel with the bridge arm C and a portion of the bridge arm D, and the combined resistance of these circuits being so correlated with the resistance in the bridge arms A and B as to permit a balanced condition to exist over the desired voltage range. The resistor C is preferably formed of a material having a suitable temperature coefficient to provide temperature compensation for the bridge circuit and prevent changes in the ambient temperature from effecting unbalance of the bridge.

The multiple-position switches 117 and 136 in the dwell circuit, as well as the multiple-position switch 126 in the tachometer circuit, are, as previously indicated, preferably embodied in a single multiple-pole multiple-position switch and are utilized to adjust the circuits so as to enable the proper testing of four-lobe, six-lobe, or eight-lobe distributors as desired, the purpose of the switches 136 and 126 being to properly calibrate the dwell meter and the tachometer, respectively. The manually operable push-button switch 151, shown in Fig. 8 as being connected between the negative terminal of the battery 120 and the negative terminal of the tachometer 4, may be used to connect the tachometer directly across the batteries 120 and 122 for calibration purposes.

As previously stated, the present invention may be used to simultaneously test the various functions of a distributor, and the tachometer, dwell meter, stroboscope, and vacuum brake mechanism may simultaneously be operated for comparative readings, so as to properly indicate the true operation of the distributor under test. In this connection, the chart previously referred to may be employed to show the required instrument readings for each phase of distributor operation.

The operation of the device, particularly when the circuit embodiment shown in Fig. 8 is used, may be as follows:

First, the control switch, or switches, are adjusted to the four, six, or eight-lobe position, as required by the distributor under test, the distributor to be tested is installed as previously described, and the stroboscope tube circuit is properly connected so that each break of the circuit breaker points in the distributor may properly affect the circuit. The stroboscope disc is then rotated at a predetermined speed by adjustment of the handle 54 and this speed is indicated by the tachometer 4. Simultaneously, the dwell meter, which is unaffected by operation of the tachometer and may be simultaneously operated therewith, will indicate whether or not the angle of cam dwell corresponds to that specified on the chart.

Most distributors for internal combustion engines are provided with two means for changing the amount of spark advance. The first of these means is the "automatic advance," which is ordinarily a simple centrifugally operated governor arranged to advance the spark as the engine speed increases. This arrangement provides for a gradual advance of the spark to insure maximum performance of the engine at higher speeds.

The second means of spark advance is the "vacuum advance" or "vacuum brake." The operation of this is controlled by the amount of vacuum existing in the engine's intake manifold at any particular moment and varies with changes in said vacuum; i. e., upon sudden acceleration intake manifold vacuum is lost and this automatically causes a retarding of the engine's spark. By retarding the engine spark in this manner, knocking or improper detonation in the engine is prevented.

It is, therefore, particularly important that these two spark advance means be tested and adjusted in accord with factory specifications.

The present invention is particularly adapted to such testing and adjusting and provides means whereby each may be tested independently of the other to insure that the distributor conforms to factory specifications and operates as required for maximum motor performance.

To provide vacuum in a controlled manner to the distributor under test, if the amount of vacuum is to be controlled by the vacuum pump motor speed, the operator may start and control the vacuum pump by operation of the rheostat switch 159 as shown, or a simple "on-off" switch may be used for the vacuum pump motor and the amount of vacuum may be regulated by a vacuum bleeder valve in a manner hereinafter described. By this means, there is applied to the vacuum advance or the vacuum brake mechanism of the distributor under test the amount of vacuum which, as indicated by the chart, is the proper vacuum for the test to be made.

The present invention permits both automatic advance and vacuum advance to be independently checked and adjusted as follows:

As changes in motor speed or distributor speed cause similar changes in the amount of automatic advance, in order to check and adjust the vacuum advance independently of the automatic advance, the distributor is first placed in operation at a uniform speed. The uniformity of the speed may be checked throughout this test by the tachometer 4, as any substantial variations in angular degrees on the stroboscope protractor ring indicate a defective automatic advance mechanism, worn bearings, etc. Furthermore, a tendency for the stroboscope arrow to jump irregularly at different points about the protractor ring will indicate "point bounce" caused by improper spring tension, worn pointer arm bearings, cam contacting surfaces, or the like.

With the distributor operating at a constant speed, as above, the vacuum may be applied to the vacuum advance or brake control in increasing amounts as indicated on vacuum gauge 7 and in accordance with the requirements of the data chart. The actual amount of spark advance or retard obtained at each vacuum setting is indicated by the stroboscope in angular degrees. This amount may be checked with the data upon the chart to insure that the distributor is performing exactly according to the standards required for a maximum motor performance.

The proper performance of the vacuum control advance or brake mechanism is indicated by a change of position of the illuminated stroboscope pointer with respect to the protractor. The precise amount in angular degrees of such change may accurately be read during actual operation of the distributor. The chart indicates the required amount of change for various readings. As the above test is made with the distributor running at a constant speed, as indicated by the tachometer, the automatic advance mechanism does not operate to influence the stroboscope disc reading. This reading, therefore, correctly represents the actual amount of advance or retard provided by the vacuum advance mechanism. Of course, any change in cam dwell during the above test may simultaneously be noted.

In order to check the operation of the "automatic advance mechanism," the vacuum pump may be disconnected and the distributor driven at the slowest speed at which it is intended to operate. At this point there is no advance of the spark. By means of the handle 68, the protractor ring may be adjusted so that each stroboscope flash is positioned opposite a zero point on the protractor ring. Thereafter, by operation of speed control handle 54, the distributor speed is increased in stages as called for by the data chart to its maximum operating speed and the amount of automatic advance at each stage is accurately indicated by the shifting of the stroboscope pointer a certain number of angular degrees over the protractor ring. When the distributor is operating properly, the number of angular degrees of such shift corresponds to the number of degrees indicated on the data chart for such speed and any deviation from the specifications of this chart indicates a condition requiring correction.

In all of the above, it will be apparent that any deviation in dwell angle is also indicated simultaneously with the other readings.

Figure 9:
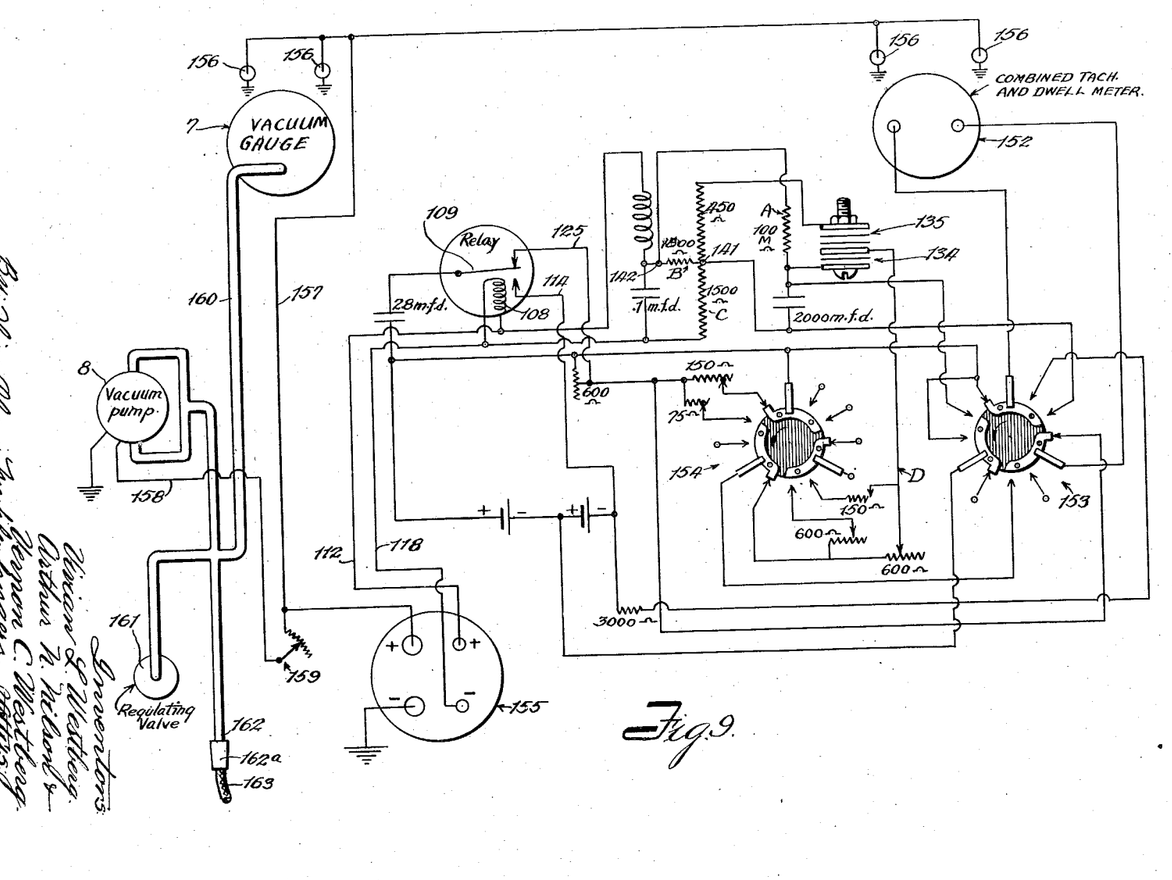
Fig. 9 is a schematic diagram showing a circuit for use in connection with a single instrument as a combined tachometer and dwell meter.

In some cases, it is desirable to eliminate one of the meters shown in Fig. 8 and to use a single meter as a combined tachometer and dwell meter, in which case the meter is preferably provided with a single pointer operating over two scales, one scale for the tachometer readings and the other for dwell meter readings. The diagram shown in Fig. 9 illustrates a circuit arrangement for use in connection with a single meter. In this circuit a combined tachometer and dwell meter 152 is used and connected in the circuit as illustrated. The circuit is substantially identical with that shown in Fig. 8, with the exception that multiple-pole three-position switches 153 and 154 are so connected in the circuit that, by suitable manipulation of the switches, the meter 152 may selectively be connected to either the tachometer or dwell meter circuit, as desired. The circuits are, of course, interconnected at some points and each functions in the same manner as previously described; however, it is necessary to operate the switches 153 and 154 to obtain the required reading from the meter.

In the embodiment shown in Fig. 9, the conductors 112 and 118 may, of course, be directly connected to the flexible terminals 72 and 73 in the same manner as shown in Fig. 8. However, for convenience, these conductors are shown connected to the socket terminals of a so-called clinch-socket portion 155 of a connector, so that suitable terminals from the synchronizing circuit conductors 102 and 104 (Fig. 8) may be plugged therein.

As previously stated, a suitable chart containing all necessary data with respect to the standardized characteristics of various distributors is supported on a pair of rollers at the top of the cabinet A. Suitable electric lights 156 (Fig. 9) are positioned in the cabinet adjacent the rollers in order to illuminate the meters. These lights are grounded and also connected to the socket 155 by means of a conductor 157 and any suitable battery connection may be made when the circuit plug is inserted in the socket 155.

The vacuum pump 8 previously mentioned is provided with a suitable motor for driving the pump, and the amount of vacuum may be controlled by varying the speed of the motor by rheostat switch 159 or by a bleeder valve 161. Switch 159 serves to connect the motor circuit to the conductor 157 and the opposite side of the motor circuit is grounded as shown. Of course, rheostat switch 159 may be a simple "on-off" switch if desired, and the amount of vacuum can be controlled solely by adjustment of the bleeder valve. A suitable power source may be provided through the socket 155 when the connection is made with the stroboscope circuit.

The vacuum system includes a conduit 160 leading to the vacuum gauge 7 and a regulating valve 161 is also used to provide a suitable vacuum control. A pressure conduit 162 is provided with a coupling 162a which may be connected to the usual vacuum brake or advance connection of the distributor under test by means of a flexible conduit 163 (Fig. 1).

Although the vacuum pump control and the meter light circuit are shown only in Fig. 9, it will be understood that they are also used in connection with the embodiment shown in Fig. 8.

Figs. 11, 12, and 13 illustrate a preferred form of cone drive for use in the transmission for driving the stroboscope friction disc 23 illustrated in Fig. 2. The preferred form shown is an automatic clutch and friction pressure control which forms that portion of the transmission which is directly connected to the motor. In this construction the motor is not suspended on the plate 12 as previously described, but instead a suitable motor 49a is supported on a bracket 164 and is preferably resiliently mounted thereon by means of a pad 165 of suitable cushioning material. The bracket 164 is rigidly supported beneath the plate 12 so as to support the motor in substantially the same position as previously described. The bracket may be an integral part of the plate or may form any suitable fixed portion of the frame of the device. In this preferred construction the friction cone 50a is slidably mounted on the motor shaft and, when the motor is at rest, the cone stands substantially in the position shown in full lines in Fig. 11, that is, retracted out of contact with the friction roller 51.

Automatic means is provided so that, when the motor attains a predetermined speed, the cone is automatically advanced substantially to the position illustrated by dotted lines and into driving engagement with the friction roller 51. The mechanism for accomplishing this result comprises a tubular motor shaft extension 166 and a rotor 167, both of which may be secured to the shaft by means of a setscrew 168. The face of the rotor 167 is provided with radial grooves 169 the outer ends of which are provided with inclined surfaces 170. The cone 50a is provided with an elongated hub 171 and is slidably mounted on the tubular shaft extension 166 and on a plurality of outwardly extending pins or guide rods 172 which latter are secured in the rotor 167 for driving the cone. A spring 168 in the tubular extension 166 normally tends to move the cone outwardly and into contact with the friction roller 51 and to retain a suitable pressure thereon.

A steel ball 173 is mounted in each of the radial grooves 169 in the rotor and normally is in the retracted position shown adjacent the hub of the friction cone. The balls 173 are retained in their respective grooves by means of a sheet metal disc 174, which disc is formed to provide radial grooves 175 therein. These radial grooves 175 in the sheet metal disc are complementary to the radial grooves 169 in the rotor. The disc 174 is slidably mounted on the hub 171 of the cone and is normally retained in the position illustrated by means of a relatively strong compression spring 176 which latter is under compression between the disc and a cover member 177, the cover member being secured to the rotor 167 by means of screws 178. The compression of the spring 176 is sufficient to normally retain the cone 50a in the retracted position shown by full lines against the compression of the spring 168. However, when the motor reaches a predetermined speed, the balls 173 are moved outwardly by centrifugal force into the inclined ends of the grooves 169 and thereby move the disc 174 substantially to the position shown by dotted lines, this permits the compression spring 168 to simultaneously move the cone into resilient friction contact with the friction roller 57. The amount of pressure with which the cone is moved outwardly depends only upon the strength of spring 168 and is independent of the load and of the motor speed.

A split ring 178 is mounted in a complementary annular groove in the hub 171 of the friction cone so that, when the speed of the motor is reduced, the projecting portion of the ring is engaged by the disc 174 and the cone is moved rearwardly by the spring 176 and against the compression of spring 168. By this means the cone 50a is retained in resilient frictional contact with the friction wall 51 during predetermined operating speeds of the motor and, as soon as the speed is sufficiently reduced, the balls 163 are forced back to their normal position by means of the spring 176 and the cone is withdrawn from driving contact with the friction roller.

The present invention is adapted for use with any internal combustion engines and is of particular use in conjunction with the testing and adjustment of engines in automobiles, airplanes, tanks, boats, trucks, etc., and particularly where such engines must be adjusted to secure maximum performance over a wide range of speeds and operating conditions.

In the present disclosure, the invention has been shown applied to internal combustion engines wherein combustion is effected by means of an electrical spark. However, it will be apparent that the herein recited testing and adjusting features of this invention may be employed in conjunction with Diesel engines and the like upon the modification of the various parts hereof to assemble the necessary information from the engine under test.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. In a stroboscopic synchronizer, a base plate, an outwardly extending stub shaft rotatably supported in said base, a friction disc on said shaft, means for supporting a distributor substantially in axial alignment with said shaft, stroboscopic means rotatable in synchronism with said disc comprising an indicator whose indication is determined by the make and break of a distributor circuit a flexible coupling for securing said stub shaft to the distributor shaft, a reversible constant speed motor pivotally supported on the back of said base, with its axis bisecting the axis of said shaft but angular thereto, a friction cone on the motor shaft with its friction surface parallel with the friction surface of said disc and its apex directed outwardly thereof, a friction idler roller between said friction cone and said disc and extending through said base, manually operable means to adjust said roller radially of said disc, and tension means between said pivoted motor and said base to retain a desired pressure on said friction elements.

2. In a mechanism for a stroboscopic synchronizer of the character described, a support comprising an angularly positioned base plate having a rotatable pointer disc mounted on the outer side of said base, the inner side of said disc having a friction surface, stroboscopic means rotatable in synchronism with said disc, comprising an indicator whose indication is determined by the distributor circuit, said base plate having a radial opening below said disc, a constant speed motor pivoted on the back of said base above the axis of said disc for swinging adjustment of said motor in the plane of the axis of said disc but transversely thereof, a cone friction wheel on said motor shaft with its friction contact line substantially parallel with the friction surface of said disc and its apex substantially in alignment with the periphery of said disc, a friction roller in said radial opening and in frictional driving relationship between said cone and said disc, means for manually adjusting said roller radially of said disc and cone, and means for resiliently tensioning said cone against said roller.

3. In a synchronizer of the character described, an angularly supported base plate having a rotatable stroboscope disc pivotally mounted on the outside of said base with its axis substantially vertical thereto and with its inner side having a friction surface, a motor supported on the inner side of said base with its axis substantially horizontal and intersecting the axis of said disc, a friction cone on the shaft of said motor with its apex substantially in alignment with the lowest peripheral margin of said disc, a friction idler between said disc and said cone and supported on said plate for axial adjustment radially of said cone and disc, and means for adjustably tensioning the friction surfaces.

4. A stroboscopic synchronizer comprising a base, a rotatable disc on said base, a power source, a variable speed transmission between said power source and said disc, a pointer rotatable with said disc, a protractor around the path of said pointer and rotarily adjustable relative to said pointer, a gas flash tube positioned to momentarily illuminate said arrow in any position of rotation, means for driving a distributor in timed relation to said disc, an electrical circuit associated with said distributor and said tube to flash said tube in timed relation with the operation of the breaker points of said distributor, said circuit including a loading condenser for delivering a momentary high break-down voltage discharge to said tube, and automatic means to vary the capacity of said condenser in accordance with variations in the speed of said disc.

5. In a distributor testing stroboscope, the combination with a rotatable pointer, means for driving a distributor and said pointer in variable timed relation, and a gas tube for momentarily illuminating said pointer in timed relation to the operation of the breaker points of said distributor, of an electrical circuit associated with said distributor and said tube, said circuit including means for impressing a high potential across the electrodes of said tube, said potential being insufficient to break down the resistance of said tube, means controlled by said distributor to momentarily reduce the resistance of said tube in timed relation to the operation of the breaker points of said distributor to thereby enable a momentary surge of said high potential to flash said tube, and automatic means to vary said high potential in accordance with the speed of said pointer and distributor.

6. A stroboscope comprising a rotatable pointer, a protractor adjustable around said pointer for reading any relative position thereof, means for driving a distributor in timed relation to the rotation of said pointer, a gas tube for momentarily illuminating said pointer in any position of rotation, a circuit for impressing a high potential across the electrodes of said tube, said potential being insufficient to break down the resistance of said tube, said circuit including a loading condenser for momentarily flashing said tube when the normal resistance of said tube is reduced, an external trigger grid adjacent said tube between the tube electrodes, means controlled by the breaker points of said distributor to intermittently and momentarily create a high potential on said trigger grid in timed relation to the operation of said breaker points so that said loading condenser will simultaneously discharge through, and flash, said tube, means to vary the speed of said pointer and distributor, and automatic means to vary the capacity of said loading condenser in accordance with variations of speed of said pointer and distributor.

7. In a distributor tester, a stroboscope disc, means to support a distributor, a power source, a variable speed transmisison for driving said disc and said distributor in synchronism over the speed range of said transmission, said transmission including a friction cone and a friction roller between said power source and said disc, said cone being normally out of contact with said roller, and means to automatically frictionally contact said cone and said disc when said motor attains a predetermined speed.

8. In a distributor tester, a stroboscope disc, means to support a distributor, a power source, a variable speed transmission for driving said disc and said distributor in synchronism over the speed range of said transmission, said transmission including a friction cone and a friction roller between said power source and said disc, said cone being normally out of contact with said roller, means to automatically frictionally contact said cone and said disc when said motor attains a predetermined speed, said last means comprising a driven shaft on which said cone is slidably mounted for movement toward and from said roller, a first resilient means normally tending to advance said cone into frictional contact with said roller, a second resilient means normally making said first resilient means ineffective, and a centrifugally controlled means to make said second resilient means ineffective to prevent advance of said cone.

VIVIAN L. WESTBERG.
ARTHUR N. NILSON.
VERNON C. WESTBERG.